United States Patent [19]

Swinson et al.

[11] Patent Number: 5,644,356
[45] Date of Patent: Jul. 1, 1997

[54] HIGH RESOLUTION FILM SCANNER

[75] Inventors: Peter Richard Swinson, St Albans; Graham Malcolm Alexander Barber, Hitchin, both of United Kingdom

[73] Assignee: Rank Cintel Limited, United Kingdom

[21] Appl. No.: 382,361

[22] Filed: Feb. 1, 1995

[30] Foreign Application Priority Data

Feb. 1, 1994 [GB] United Kingdom ............. 94 01 907

[51] Int. Cl.$^6$ .............................. H04N 3/38; H04N 3/40
[52] U.S. Cl. ............................................ 348/96; 358/506
[58] Field of Search ..................... 348/96, 97; 358/506; H04N 3/38, 3/40

[56] References Cited

U.S. PATENT DOCUMENTS 5,400,117  3/1995  Fetterman ........................ 348/96

FOREIGN PATENT DOCUMENTS

| 569142A | 11/1993 | European Pat. Off. |
| 9307566 | 9/1993 | Germany. |
| 4337156 | 9/1994 | Germany. |
| 1532400 | 7/1977 | United Kingdom. |
| 1597504 | 7/1977 | United Kingdom. |
| 2124449 | 7/1983 | United Kingdom. |
| 2160740 | 7/1983 | United Kingdom. |

OTHER PUBLICATIONS

Bosch and Philips, BTS (*Broadcast Television Systems GmbH*), "FDL 60 An Advanced Film Scanning System—for both Broadcast and Post Production", Germany, pp. 1–16, Jul. 1979, (Montreux).

Bosch and Philips, BTS (*Broadcast Television Systems GmbH*), "FDL 90 CCD–Telecine—Setting new standards in post–production versatility", Germany, Apr. 1991, (NAB).

Bosch and Philips, BTS (*Broadcast Television Systems GmbH*), "FLH 1000 Multi–Standard HD Telecine", Germany, Apr. 1993, (NAB).

Lees, R.T., et al., Montreux Symposium, "HDTV Telecine Design", 1991, pp. 542–551.

Lees, R., et al., *SMPTE Journal*, "High–Performance CCD Telecine for HDTV", vol. 99, #10, Oct., 1990, pp. 837–843.

Marconi Communication Systems, "Digital Line Array Telecine", B3410, U.K., 1986.

Rank Cintel Limited, "ADS 1 Advanced Digital Scanner", U.K., Sep. 1982, (IBC).

Rank Cintel Limited, "ADS 2 Advanced Digital Scanner", U.K., Sep. 1982, (IBC).

Wright, D.T., BBC (*British Broadcasting Corporation*, "Solid State Sensors: the use of a single dimension 512 element array for film scanning", BBC RD 1973/32, Nov., 1973, pp. 1–17.

A. Kurtz, et al., SPIE Camera and Input Scanner Systems, "Optical Scanning System For a CCD Telecine for HDTV", vol. 1448, 191–205, (1991).

*Electronic International*, "Optical Waveguide Shares Chip With Active Elements", Jul. 19, 1973, pp. 3E–9E.

Arthur J. Cosgrove, "A Digital CCD Telecine for HDTV Joint Development of the Eastman Kodak Company and BTS GmbH", *135th SMPTE Technical Conference Proceedings*, Oct. 1993.

Primary Examiner—Howard W. Britton
Attorney, Agent, or Firm—Ostrolenk, Faber, Gerb & Soffen, LLP

[57] ABSTRACT

A film scanner scans a frame of film three times by reciprocating a clapper gate assembly (160) holding the film (50) past a solid state line array sensor (210). Successive scans are in an opposite sense to the previous scan and R,G,B filter wheel (40) is placed in the optical path and advanced for each scan so that separate high resolution R,G and B scan are produced which can be combined to form a high resolution video signal.

16 Claims, 4 Drawing Sheets

HIGH RESOLUTION FILM SCANNER

FIELD OF THE INVENTION

This invention relates to scanning of film for conversion between optical and electrical information, and in particular to methods and apparatus for performing high resolution scans with accurate image registration.

BACKGROUND OF THE INVENTION

Film is a very high capacity information storage medium. Under the right storage conditions film has a very slow decay rate which makes it an ideal archive medium. Conventionally film has been used to store picture image information in either monochrome or colour. In this mode the film stores the equivalent of analogue information and possesses an extensive range of densities. Film may also be used in a binary fashion to store digital information.

Film has been scanned for conversion into electrical signals for many years. A prime example of such conversions are the telecine products such as the URSA flying spot, or ADS line array CCD telecines manufactured by Rank Cintel. These telecines convert film data into television signals for use in video and broadcasting applications. These conversions do not extract all the data from the film. Conventional telecines merely extract sufficient data to fit the bandwidth of the television system being used.

Television standards are periodically upgraded as the economics of new technologies permit. Furthermore, the television, video and film industries are continually calling for picture image data to be available in greater detail (resolution) to allow seamless artifact free image processing to be carried out. In this context resolution may appertain to either spatial or temporal resolution or to pixel dynamic level resolution.

Traditionally electronic picture image processing has relied upon bespoke electronic hardware. It has now become practical to use general purpose computer platforms to process picture image data in digital form. To use these computers to carry out seamless artifact free picture image processing on film images requires that these film images are scanned to extract all the information that they contain. This means resolving the detail down to the granular structure of the film stock used, and to resolve the films individual colour density ranges to a sufficiently accurate degree. This is referred to as resolution independent digital film.

To extract all the information from a film frame demands that the image is scanned so as to resolve each colour's data to the point where the inherent media noise (grain) and image dispersion becomes dominant. It has been deduced that with 35 mm negative film this corresponds to approximately 4000 to 6000 picture element sites across its exposed width. A corresponding proportionate number of picture lines are then required across the frame height. This may be 2500 to 4000 lines depending upon the film format and whether square pixel information is required or not.

To obtain the colour density at any pixel requires that light passed is analyzed into its three primary colour components Red (R), Green (G), and Blue (B); and then each of these primary colours is quantified as to its individual relative level. A suitable means for analysing the primary component colours in a film is either to filter the white light into the R,G,B primaries before illuminating the film frame, or to illuminate the film frame with white light and then split the resulting image into its three primary R,G,B components using a colour splitter block. The former technique has the advantage of simplicity and cheapness as only one sensor need be used, but has the disadvantage that a separate scan has to be made for each colour. The latter technique has the disadvantage of expense as a colour splitter and three sensors are required, but has the advantage that only one scan of the film frame is required. A filter wheel may also be used after film illumination but this then puts the filter wheel between the image and image sensor and causes loss of quality of the image.

Sensing light levels can be performed using a variety of technologies. One excellent method is to use Photomultiplier tubes (PMT's). Another technique is to use Avalanche Photo Diodes (APD's), or alternatively to use Charge Coupled Devices (CCD's). All of these devices when correctly driven produce an electrical output which is proportional to the light incident upon them.

The PMT's and APD's require that the light incident upon then is rastered corresponding to scanning the film. This rastering of the light usually involves so called flying spot techniques and is relatively expensive but ideal for real time image scanning.

The CCDs come in two forms—line array and area array. The line array CCD's can sense light in just one line. The area array CCD's can sense light in a plane. Neither CCD types require the light to be rastered. The area array CCD can effectively capture the whole film frame's light variation in one instance whereas the line array CCD can only capture instantaneously one lines worth of the film frames light variation. Thus to use line array CCD sensors requires that the film frame image is moved relative to the sensor in order to capture the whole image. The trade off between using area array versus line array CCDs comes down to one of economics of sensor costs, as the mechanical and electrical cost differences for the two approaches compensate for each other. Needless to say the cost of a line array CCD with 4000 elements is much less expensive than an area array sensor with 1,600,000 elements.

In line array scanners three scans are performed; one scan for each of red, green and blue light. Alternatively three line arrays can be used along with an optical splitter.

There are a number of ways the film image can be moved relative to the line array sensor including:

— use a flipping mirror
— use a rotating prism
— moving the line sensor across the film frame
— moving the film frame across the line sensor The use of a flipping mirror or rotating prism suffer from poor resultant image linearity. Moving the line sensor across the film frame gives a resultant image which is subject to optical shading errors which would have to be corrected; this is also a physically bulky element of the system. Moving the film frame across the line sensor is, therefore, preferred.

To obtain mechanical accuracy of the film frame location the Bell & Howell Clapper Gate has been used. This device has been used for the last 50 years in the film printing industry and is readily available from a number of precision mechanics manufacturers around the world (Oxberry, Nielson Hordell) for inclusion in OEM products.

This type of film gate assembly pins the film frame to give mechanical accuracy and has a film lift and advance mechanism to allow the next frame to be brought into the gate aperture and be pinned to the same location. If the film frame were not pinned to the same location then when transferring film frames from a movie the images would be subject to weave and hop due to the variation in interframe location.

SUMMARY OF THE INVENTION

It is an object of the invention to provide a method and apparatus for scanning film with high accuracy. We have appreciated that in order to scan film to achieve a high resolution output with accurate registration of the image, precise film positioning is required. In its broadest form the invention resides in the use of a moveable gate to which film to be scanned is held fast.

According to the invention there is provided a film scanner comprising a scanning means comprising a light source and light sensitive line sensor, a film gate assembly for advancing film past the light sensitive line sensor arranged between the light source and the light sensitive line sensor and having means for holding the film fast with respect thereto, and means for moving the film gate assembly past the light sensitive line sensor whereby a film frame held in the film gate assembly is scanned.

The invention has the advantage that film, which is a flexible material, is held to the solid base of the film gate assembly while the scanning is performed. This enables both accurate positioning and accurate position measurement of the film to be achieved. The resultant scan may, therefore, be of high resolution and be accurately registered so that several scans of the same film image may be accurately registered to one another. Preferably, the film gate assembly includes a pin register mechanism so that the film is mechanically registered to the gate.

Embodiments of the invention may also comprise a position sensor for sensing the precise location of the film gate assembly with respect to the light sensitive line sensor, and control means for controlling when data from the light sensitive line sensor is read. This has the advantage that the position sensor output data can give an absolute determination of when to read film data using the line sensor, to a high degree of accuracy. This has the further advantage that the accuracy of the means for moving the film gate assembly is not critical.

As the film gate and film are moved as a total unit there is no need to account for the flexibility of the film. Moreover, movement of the gate assembly is easily detected and controlled whereas film movement is much more difficult both to detect and control.

Preferably the film gate assembly is moved reciprocally and the scanner comprises an eccentric cam for moving the gate. Preferably, the cam is profiled so that the gate moves with constant speed while the film is being scanned.

Preferably, a first scan of each frame of film is performed for a first colour filter in the optical path to produce a first colour signal. Second and third colour scans are then produced from which a composite three colour video signal may be formed. By combining three colour scans together, a high resolution colour video signal can be produced. Whilst such a system most probably operates in non-real time it might be possible to achieve real time operation.

Preferably, the second scan is performed with the film gate assembly moving with respect to the line sensor in a direction opposite to that of the first and third scans. Thus, the film gate assembly is reciprocable. This has the advantage that scanning time is decreased by using the return movement of the film gate. The system preferably includes a control means which takes into account that the second scan is performed in the opposite direction from the first and third scans.

Preferably, the film gate assembly is a clapper gate assembly.

DETAILED DESCRIPTION OF THE PREFERRED EMBODIMENT

Figure 1:
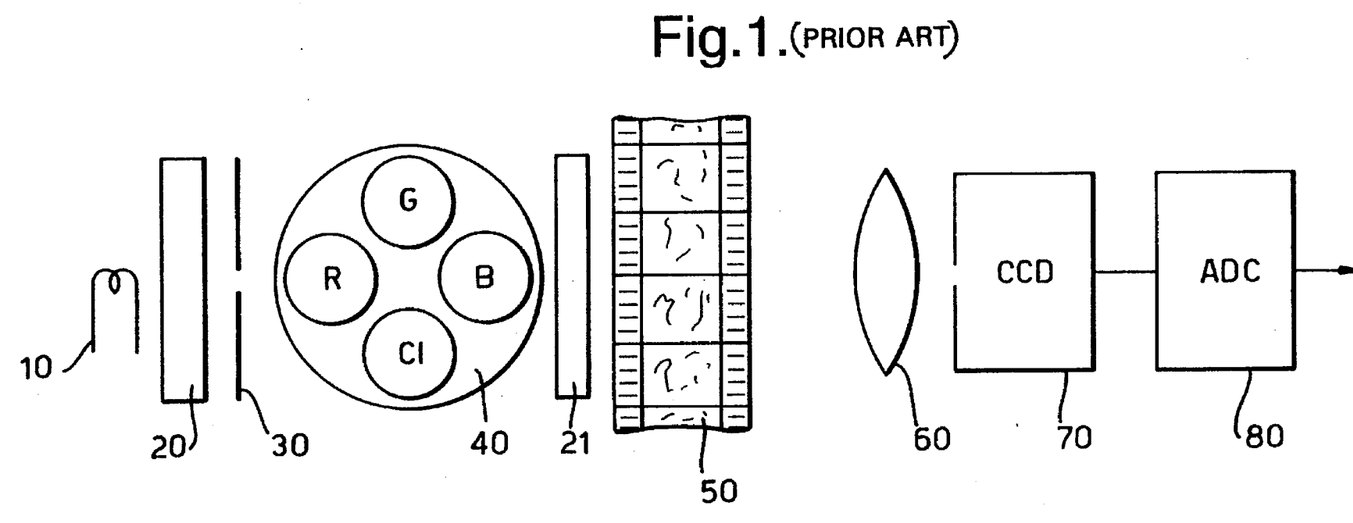
FIG. 1 shows schematically a basic imaging system.

The imaging system of FIG. 1 may be used to scan film for conversion into electrical signals representative of the images recorded on the film. A light source 10 is used to illuminate a diffuser 20 which provides even illumination on optical slit 30. The light passing through optical slit 30 passes through one of four filters which are mounted on a filter wheel 40. The filter wheel is rotatable so that one of the four filters; red, green, blue or clear, may be selected for each scan. The filtered light then passes through a second diffuser 21 and illuminates a photographic film 50.

A line of the illuminated film is imaged by optical element 60 onto a light sensitive line sensor, here a line array CCD sensor 70 of known type. In order to image each frame of the film, the film 50 and line array CCD sensor 70 are moveable with respect to each other. Each frame is imaged line-by-line by the line array CCD sensor 70 and the electrical output passes to an analogue-to-digital convertor 80 until a complete frame is imaged. The resultant electrical signal is a single colour signal R,G or B for the frame depending which filter is in the optical path. Once the frame has been imaged by illumination with one of red, green or blue light, the frame is the imaged, in turn, by illumination with the other two colours. The film 50 is then advanced so that a second frame is illuminated and the entire scanning process is repeated. The film 50 is advanced one frame at a time by a film gate assembly, here a clapper gate assembly; a typical prior art gate clapper gate is shown in FIGS. 2a) to 2d).

Figure 2A:
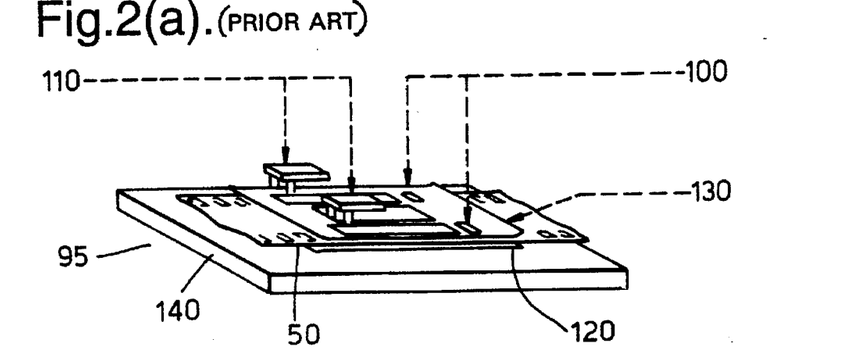
FIGS. 2a–2d show a prior art film transport mechanism.
Figure 2B:
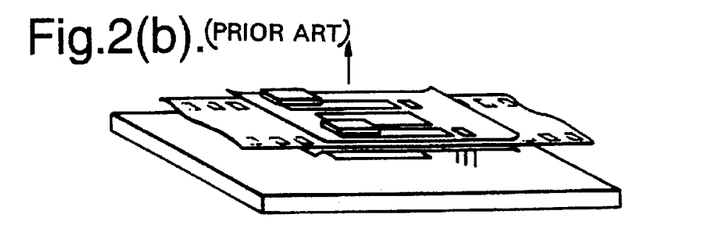
Figure 2C:
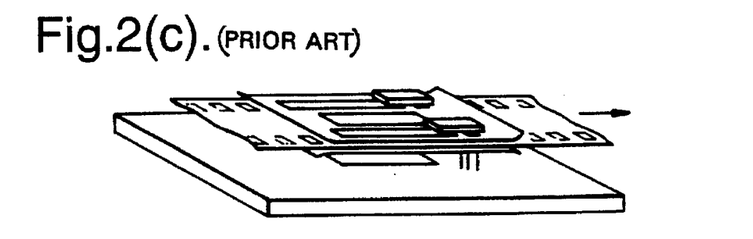
Figure 2D:
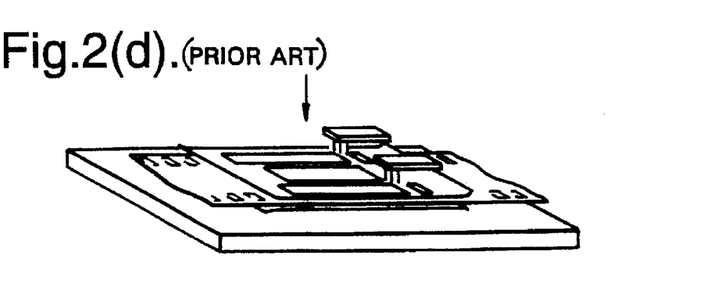

The clapper gate 95 shown in FIGS. 2a) to 2d) comprises fixed register pins 100, transport pins 110, a stripper plate 120, a pressure plate 130 and a gate plate 140. The action of the clapper gate mechanism is in four stages as shown in FIGS. 2 (a–d). In the first stage (FIG. 2a) the film 50 is held against the gate plate 140 by stripper plate 120 and pressure plate 130. Register pins 100 locate in the sprocket holes of the film fixing the film in a precise location. In this position a film frame is scanned. In the second stage (FIG. 2b) the film is lifted free of the register pins 100 by the stripper plate 120, and the transport pins 110 locate in the film sprocket holes. In the third stage (FIG. 2c) the transport pins 110 pull the film down so that the next frame is positioned in the gate mechanism. In the fourth stage (FIG. 2d) the stripper plate is lowered and the fixed register pins locate in the film sprocket holes. The frame is precisely located in this position by the fixed register pins 100 and held firmly between the stripper plate 120 and the pressure plate 130 clamped against the gate plate 140. In this position the film frame is mechanically fixed so that the next frame now held in the clapper gate may be scanned.

It will be appreciated that the pull down gate described is intended for use in an intermittent film scanner; that is the film is stationary while it is being scanned. In the embodiment of the invention to be described the gate assembly is modified so that it can be used in a linear reciprocating motion type scanner where the film is moved past the scanning location during scanning of a frame.

Figure 3:
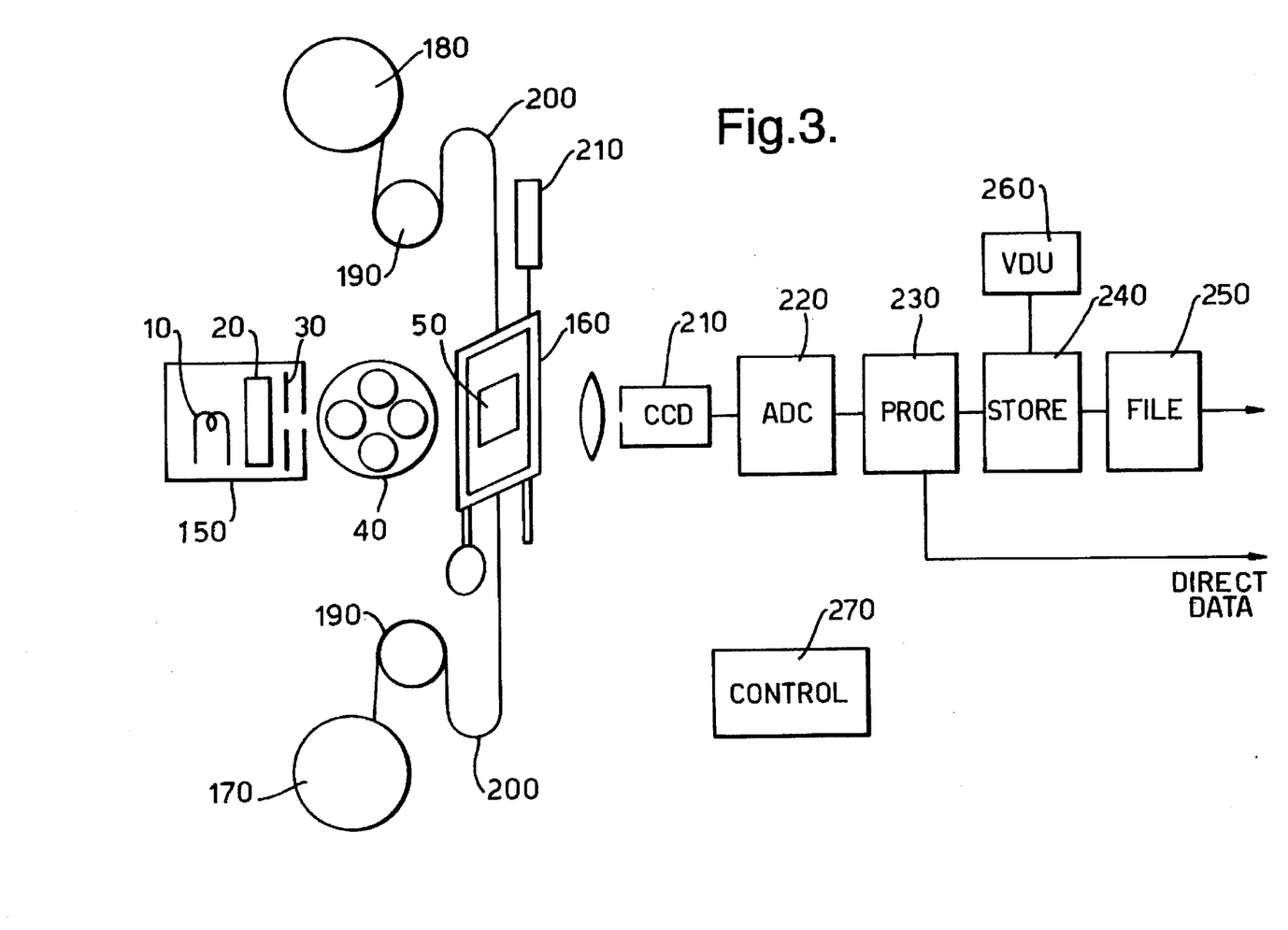
FIG. 3 shows a scanning mechanism embodying the invention.

FIG. 3 shows how the modified clapper gate may be used in the system of FIG. 1. For convenience, like components are referred to by the reference numbers used in relation to FIG. 1.

FIG. 3 shows a schematic diagram of one embodiment of the present invention. A light source 150 comprising light 10, diffuser 20 and slit 30 illuminates film held in the clapper gate 160 after passing through one of the filters mounted on filter wheel 40. In order to produce a full colour scan of the film 50, three separate single colour scans of each film frame are performed. The filter wheel 40 is thus rotated between scans so that the film 50 is successively illuminated with red, green and blue light. The fourth filter in the wheel 40 is a clear filter which may be used for test and calibration purposes.

Film is fed through the clapper gate assembly 160 from the let off spool 170 to take up spool 180 via driven film sprockets 190. The driven film sprockets 190 provide free film loops 200 by releasing the tension from the let off and take up spools 170 and 180, and are driven by stepper motors. The free film loops 200 allow the clapper gate assembly 160 to operate unimpeded by the film tension from the let off and take up spools 170 and 180. The film is actually held between the stepper motor driven sprockets and the free film loops are inserted by the operator at start up. As the film is held by the sprockets the film loops are maintained.

A strip of illuminated film frame 50 is imaged onto known light sensitive line detector 210 which converts the varying light levels in the image to electrical signals. The light sensitive line detector 210 chosen in this embodiment is a single line array CCD sensor which outputs an analogue electrical signal related to the incident light intensity, which is then input to analogue to digital convertor 220. The analogue to digital convertor 220 converts the signals from the line array CCD sensor in known manner to digital data which may then be processed digitally for transmission in a suitable format. It should be understood, however, that the invention is not limited to digital data output devices and may be used with an analogue system.

To obtain an adequate dynamic signal level resolution a 16 bit analogue to digital convertor is chosen and a 16 bit word per colour pixel is used. The output of ADC 220 is sent to processor 230 which may be a general purpose computer processing device. The processor outputs to high resolution picture image buffer store 240 which in turn outputs to file formatter 250. The purposes of the processor 230, image buffer store 240 and file formatter 250 are to convert the data into image frames of a suitable format. Such techniques are known in the art and are beyond the scope of this application. Data may be taken direct from processor 230 for further processing, and the frame stored in store 240 may be retrieved and viewed using monitor VDU 260. The scanning processes and the image processing path are controlled by controller 270.

Figure 4:
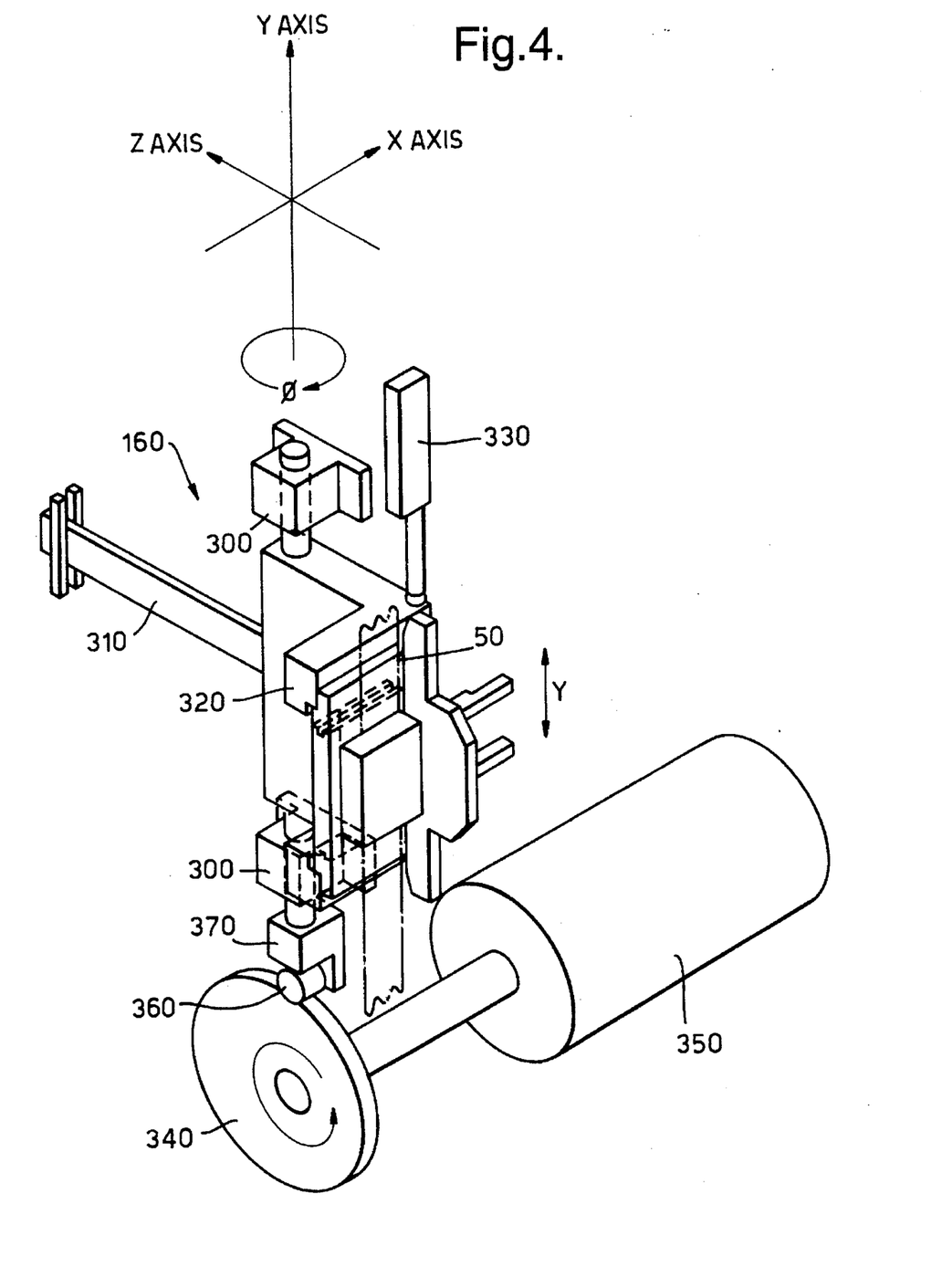
FIG. 4 shows a clapper gate mechanism embodying the invention.

FIG. 4 shows a the clapper gate assembly in more detail. The clapper gate assembly 160 is freely reciprocable along a length of the Y axis and is prevented from lateral movement in the X and Z directions by guide bushes 300, and from rotation by anti-rotation arm 310. The assembly comprises the clapper gate 320, as previously described and the lift and advance mechanisms which act together to advance the film. Such an assembly is well known and details will not be discussed here.

A linear position detector 330 is mounted in a fixed position with respect to the scanner and measures the position of the clapper gate assembly along the Y axis. The linear position detector 330 produces an output indicative of the position of the clapper gate, and since the film is held stationary with respect to the clapper gate while being scanned, the location of the line of film being scanned can be deduced. The detector may, for example, be an interferometer. The linear position detector is effectively locked to the film frame through the clapper gate and fixed register pins. The clapper gate is moved along the Y axis by a cam 340 which is rotated by motor 350. The cam acts on follower 360 which is mounted on follower block 370 attached to the clapper gate assembly. As the cam 340 rotates and acts on follower 360 the clapper gate assembly is raised and lowered along the Y axis. The cam profile is machined to ensure linear film motion in either direction along the Y axis to the required accuracy. Contact between cam 340 and follower 360 is maintained by the force of gravity; though means, such as a spring, may be provided to supply a biasing force.

The action of the scanner as a whole, will now be described.

A line of film 50 is imaged onto the CCD sensor by which the image is converted to an analogue electrical signal and output to processor 230, buffer store 240 and file formatter 250 as described above. A line of film is thus converted into a digital file which may be manipulated by a computational means. Interferometer 330 establishes the position of the clapper gate with respect to a fixed reference and provides a continuous measure of film frame position detected. In fact, the position detected is the clapper gate position but as the film frame is held fast to the clapper gate the measurements are effectively the same. The position signals from the position detector are fed to the controller 270 which uses them to control the timing of the line scanner CCD 210; the detected position determines when the film data is read from the sensor. The cam 340 is turned by motor 350 again under control of controller 270 and in response to the detected position of the clapper gate. The control of movement of the gate based on rotation of the cam under the controller 270 is only coarse and could be omitted. The high accuracy of the system is provided by the interferometer derived position measurements. The action of the cam on follower 360 moves the clapper gate assembly reciprocally along the Y axis so that each frame of the line by line film is imaged, and converted to a digital file which is given a line reference. After one scan a file is produced which represents one colour signal for the frame in digital 16 bit format. To produce a complete single colour image the cam turns through 180°; moving the clapper gate assembly from a first position of momentary rest to a second position of momentary rest. The film is held firmly in the clapper gate 320 during this process, providing extremely accurate positioning and position detection of the film. The resultant electrical representation of the film image is consequently of very high resolution suitable for high definition broadcasting. In this embodiment the film plane is fixed, as lateral and rotational movements of the clapper gate assembly are prevented by guide bushes 300 and anti-rotation arm 310. This is a mechanically simple arrangement; other arrangements may be used which allow controllable motion of the clapper gate assembly.

In order to produce a full three colour electrical representation of the film image three scans are performed in the manner described, one for each colour component. Conventionally the 3 colour components are red, green and blue. The first scan is performed with the film imaged with, for example, red light being provided by the placement of the red filter of the filter wheel 40 in the optical path. The first scan is performed while the clapper gate assembly moves in a first direction along the Y axis. Once the first scan has been performed, the filter wheel is rotated so that a different, for example green, filter is used to image the film. The second scan, with green light, is performed with the clapper gate assembly moving in the (opposite) second direction along the Y axis. Once the second scan is complete, the clapper gate has returned to its original position prior to the first scan. The filter wheel is then rotated to image the film with blue light, and the third scan is performed with the clapper gate assembly again moving in the first direction along the Y axis. After the third scan, the lift and advance mechanism of the clapper gate is operated to bring the next film frame into position in the gate aperture while the clapper gate assembly moves back in the second direction during this fourth movement of the clapper gate the clear filter on filter wheel 40 may be put into the optical path to enable stripe correction of the CCD sensor. Stripe correction is a well known technique for compensation for variations in response between elements of the sensor and is well documented elsewhere.

The three colour scans are then repeated, producing a full colour digital representation of the next frame. Subsequent frames are also scanned in this way. As the detection of the clapper gate assembly position is extremely accurate, each scan is very precise and consequently the three separate colour scans may be registered together with great accuracy. As the second scan is performed in the opposite sense to the first and third scans, such that the bottom line of the first scan is the top line of the second scan, the interferometer 330 must indicate the sense of movement as well as its magnitude to the controller 270 so that the controller knows which colour scan is being performed in which direction and which line is being scanned at a given time. The scans are combined together by processor 230 and held in store 240, and are output to file formatter 250 for conversion into a suitable format for transmission or storage. Alternatively, VDU 260 may be used to view the image directly.

Control unit 270 provides simple control electronics for controlling the synchronisation of the rotation of filter wheel 40, the rotation of cam 340, the position detector 330 and the CCD sensor 210. The controls all derive from the position measurements supplied by the interferometer position detector 330 which dictates the reading of line scans and movement of the cam.

Stripe correction, which is known in the art is facilitated with the provision of the clear filter. The operator may illuminate the CCD sensor, with no film in the gate, with white light. Corrective circuitry in the detection system, may then correct for any variation in the sensitivity of elements in the CCD array 210. The proposed embodiment also allows for stripe correction to take place using each of the colour wheel spectral should the line array sensitivity, and necessary correction, vary with colour.

Although described in terms of a non-real time system requiring three sequential scans, the invention may have benefit in a single sequential scan system which would allow real-time scanning whilst benefiting from the advantage of having the film stationary relative to the clapper gate assembly during scanning.

Although described in relation to continuous cinematographic film, the embodiments described may be used with strips of single frame non inter-related film.

The embodiment described uses a clapper gate, although other film gates which can hold the film fast may be used. In the embodiment the film is held using a pin register mechanism although other methods may be devised.

We claim:

1. A film scanner comprising a scanning means comprising:
    a light source;
    a light sensitive line sensor;
    a film gate assembly for advancing film past said light sensitive line sensor and arranged between said light source and said light sensitive line sensor and having means for holding film fast with respect thereto;
    means for moving said film gate assembly past said light sensitive line sensor to scan film held in said film gate assembly;
    a position sensor for sensing the precise location of said film gate assembly with respect to said light sensitive line sensor; and
    control means for controlling data when data from the light sensitive line sensor is read in accordance with data from said position sensor.

2. A film scanner according to claim 1, wherein said control means comprises means for controlling said means for moving said film gate assembly in accordance with positional information from said position sensor.

3. A film scanner according to claim 1, wherein the said position sensor comprises an interferometer.

4. A film scanner according to claim 1, wherein said film gate assembly is reciprocatable past said line array sensor.

5. A film scanner according to claim 1, wherein said film gate assembly comprises a pin register gate.

6. A film scanner according to claim 1, wherein said film gate assembly comprises a clapper gate assembly.

7. A film scanner according to claim 1 wherein said light sensor is a solid state line array.

8. A film scanner according to claim 1, wherein said means for moving the film gate assembly includes a motor driven cam.

9. A film scanner according to claim 8, wherein said cam is profiled to move said film gate assembly at a substantially constant speed while film held therein is scanned.

10. A film scanner comprising a scanning means comprising:
    a light source;
    a light sensitive line sensor;
    a film gate assembly for advancing film past said light sensitive line sensor and arranged between said light source and said light sensitive line sensor and having means for holding film fast with respect thereto;
    means for moving said film gate assembly past said light sensitive line sensor to scan film held in said film gate assembly;
    a plurality of filters insertable into an optical path between said light source and said film gate assembly, wherein each frame of film is scanned a plurality of times each scan being performed with a different one of said plurality of filters inserted into said optical path, and said film gate assembly moving, for each scan after the first, in a direction opposite to that of the previous scan.

11. A film scanner according to claim 10, wherein said plurality of filters comprises a filter wheel having three coloured filters and a clear filter.

12. A film scanner according to claim 10, wherein said plurality of filters comprises red, green and blue filters.

13. A film scanner comprising a scanning means comprising:
    a light source;
    a light sensitive line sensor;

a film gate assembly for advancing film past said light sensitive line sensor and arranged between said light source and said light sensitive line sensor and having means for holding film fast with respect thereto; and means for moving said film gate assembly past said light sensitive line sensor to scan film held in said film gate assembly, wherein said film gate assembly is mounted on guide bushes to constrain movement in directions orthogonal to the direction in which film is advanced past the scanner.

14. A film scanner comprising a scanning means comprising:

a light source;

a light sensitive line sensor;

a film gate assembly for advancing film past said light sensitive line sensor and arranged between said light source and said light sensitive line sensor and having means for holding film fast with respect thereto, said film gate assembly comprising an anti-rotation arm; and means for moving said film gate assembly past said light sensitive line sensor to scan film held in said film gate assembly.

15. A method of scanning film with a film scanner, said film scanner comprising:

a scanning means;

a light source;

a light sensitive line sensor; and a film gate assembly for advancing film past said light sensitive line sensor and interposed between said light source and said light sensitive line sensor;

said method comprising:

holding frames of film to be scanned in said film gate assembly;

performing a first scan by scanning a frame of film by moving said film gate assembly past said light sensitive line sensor in a first direction;

performing a second scan of said frame of film by moving said film gate assembly past said light sensitive line sensor in a second opposite direction; and performing a third scan of said frame of film by moving said film gate assembly past said light sensitive line sensor in said first direction.

16. A method according to claim 15, comprising:

interposing a first coloured filter in the optical path between said light source and said film gate assembly prior to said first scan, whereby said first scan produces a first coloured signal;

interposing a second, different colour filter prior to said second scan, whereby said second scan produces a second colour signal;

interposing a third still different coloured filter prior to said third scan whereby said third scan produces a third colour signal; and combining said first, second and third colour signals to form a video signal.

* * * * *

UNITED STATES PATENT AND TRADEMARK OFFICE
CERTIFICATE OF CORRECTION

PATENT NO. : 5,644,356
DATED : July 1, 1997
INVENTOR(S) : Peter R. Swinson et al.

It is certified that error appears in the above-indentified patent and that said Letters Patent is hereby corrected as shown below:

Col. 8, line 17, delete "data" first occurence.

Signed and Sealed this

Tenth Day of March, 1998

Attest:

BRUCE LEHMAN

*Attesting Officer*  *Commissioner of Patents and Trademarks*